US008614260B1

(12) United States Patent
Hamouz et al.

(10) Patent No.: US 8,614,260 B1
(45) Date of Patent: Dec. 24, 2013

(54) CROSS-LINKED POLYPHOSPHONATE COMPOSITION FOR REMOVAL OF METAL IONS FROM WASTEWATER

(71) Applicant: King Fahd University of Petroleum and Minerals, Dhahran (SA)

(72) Inventors: Othman Charles Sadeq Othman Al Hamouz, Dhahran (SA); Shaikh Asrof Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/652,454

(22) Filed: Oct. 15, 2012

(51) Int. Cl.
*C08J 11/04* (2006.01)
*B01J 49/00* (2006.01)
*B01D 65/02* (2006.01)
*B01D 61/02* (2006.01)

(52) U.S. Cl.
USPC .............. 521/40; 521/31; 210/652; 210/636; 210/639

(58) Field of Classification Search
USPC .................. 521/40, 31; 210/652, 636, 639
See application file for complete search history.

(56) References Cited

U.S. PATENT DOCUMENTS

2008/0060997 A1 3/2008 Musale et al.
2008/0060999 A1* 3/2008 Musale et al. ................ 210/636

FOREIGN PATENT DOCUMENTS

DE 101 05 073 A1 8/2002

OTHER PUBLICATIONS

S. Asrof Ali, S. Zaka Ahmed, and E.Z, Hamad, "Cyclopolymerization studies of diallyl-and tetraallylpiperazinium salts", *Journal of Applied Polymer Science*, vol. 61, Iss. 7, pp. 1077-1085, Aug. 15, 1996.
Kiefer, Randolf et al. (2001) "Sorption of Heavy Metals onto Selective Ion-Exchange Resins with Aminophosphonate Functional Groups". *Industrial & Engineering Chemistry Research*, 40:4570-4576.
Kumara, C, Pramod et al. (2007) "Uptake and Desorption of Copper Ion Using Functionalized Polymer Coated Silica Gel in Aqueous Environment". *Separation and Purification Technology*, 57:47-56.
Tao, Yugui et al. (2009) "Removal of Pb(II) from Aqueous Solution on Chitosan/TiO2 Hybrid Film". *Journal of Hazardous Materials*, 161:718-722.
Ali, Shaikh A. et al. (2010) "Synthesis and Solution Properties of a ph-Responsive Cyclopolymer of Zwitterionic ethyl 3-(N,N-diallylammonio) propanephosphonate". *Journal of Polymer science*, 48:5693-5703.
Liu, J. et al, (2010) Novel Negatively Charged Hybrids. 3. Removal of Pb2+ from Aqueous Solution Using Zwitterionic Hybrid Polymers as Adsorbent. *Journal of Hazardous Materials*, 173:438-444.
Liu, J. et al. (2010) "Preparation of Zwitterionic Hybrid Polymer and its Application for the Removal of Heavy Metal Ions from Water". *Journal of Hazardous Materials*. 178:1021-1029.
Liu, Junsheng at al. (2011) "Preparation of Negatively Charged Hybrid Adsorbents and Their Applications for Pb2+ Removal". *Industrial & Engineering Chemistry Research*, 50:8645-8657.
Kesenci, Kemal et al. (2002) "Removal of Heavy Metal Ions from Water by Using Poly(Ethyleneglycol Dimethacrylate-Co-Acrylamide) Beads". *European Polymer Journal*, 38:1443-1448.
Kerstin Riedelsberger and Werner Jaeger, "Polymeric aminomethylphosphonic acids—1. Synthesis and properties in solution", Designed Monomers and Polymers, vol. 1, Issue 4, 1998.

* cited by examiner

*Primary Examiner* — Michael Bernshteyn
(74) *Attorney, Agent, or Firm* — Richard C. Litman

(57) ABSTRACT

The cross-linked polyphosphonate composition for the removal of metal ions from wastewater is a cross-linked anionic polyelectrolyte polymer having the formula:

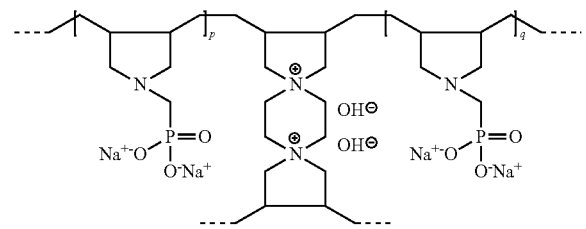

The cross-linked anionic polyelectrolyte is made by cyclocopolymerizing diallylaminomethylphosphonic acid and 1,1,4,4-tetraallylpiperazinium dichloride (a cross-linker) to form a cross-linked polyzwitterionic acid (CPZA). The CPZA is then treated with a base, such as sodium hydroxide, to form a cross-linked anionic polyelectrolyte polymer having the above formula. The composition may be used to remove heavy metal ions, such as $Cu^{2+}$ and $Pb^{2+}$, from wastewater.

10 Claims, 7 Drawing Sheets

CROSS-LINKED POLYPHOSPHONATE COMPOSITION FOR REMOVAL OF METAL IONS FROM WASTEWATER

BACKGROUND OF THE INVENTION

1. Field of the Invention

The present invention relates to chemical treatment of wastewater, and particularly to a composition for removal of metal ions from wastewater that is effective for removing such metal ions as $Pb^{2+}$ and $Cu^{2+}$ from wastewater and the like.

2. Description of the Related Art

The presence of heavy metal ions, such as $Pb^{2+}$, $Cu^{2+}$ and the like, in natural and wastewater systems is a matter of great concern due to their negative effects on the environment and human health. These toxic pollutants are non-biodegradable and can accumulate in the human body, causing a variety of diseases and disorders. Various techniques (such as adsorption, precipitation, dialysis, ion exchange, reverse osmosis and extraction) have been developed for the removal of metal contaminants from water resources.

One of the most attractive among these techniques is the adsorption process, due to the availability of different types of low-cost and environmentally friendly adsorbents. Inorganic/organic polymer hybrid adsorbents have been widely investigated. Their efficacies in metal ion removal are attributed to the formation of a stronger chemical bonding between $M^{n+}$ and, for example, amine motifs in the hybrid materials.

Recently, research has focused on the syntheses of zwitterionic cross-linked inorganic/organic hybrid materials for the removal of heavy metal ions via electrostatic effects. A titania-phosphonate hybrid porous material has been found to have a large capacity for selective adsorption of $Cd^{2+}$ ions. Considerable attention has also been given to the synthesis of chelating agents containing aminomethylphosphonate motifs, owing to their extraordinary chelating properties in extracting heavy metal ions from wastewater. Such materials, however, are not 100% effective in the removal of metal ions and, more importantly, are extremely difficult and costly to synthesize.

Thus, a composition for removal of metal ions from wastewater solving the aforementioned problems is desired.

SUMMARY OF THE INVENTION

The cross-linked polyphosphonate composition for the removal of metal ions from wastewater is a cross-linked anionic polyelectrolyte that removes metal ions, such as $Pb^{2+}$ and $Cu^{2+}$, from wastewater and the like. The cross-linked anionic polyelectrolyte has the formula:

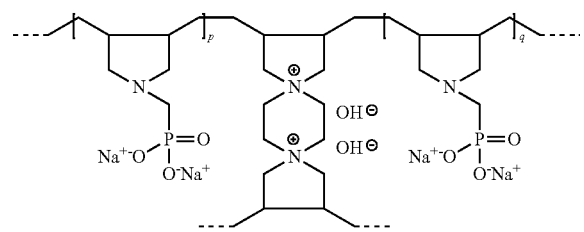

The cross-linked anionic polyelectrolyte is made by cyclocopolymerizing diallylaminomethylphosphonic acid and 1,1,4,4-tetraallylpiperazinium dichloride (a cross-linker) to form a cross-linked polyzwitterionic acid (CPZA). The CPZA is then treated with a base, such as sodium hydroxide, to form a cross-linked anionic polyelectrolyte polymer having the above formula.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The cross-linked polyphosphonate composition for the removal of metal ions from wastewater is a cross-linked anionic polyelectrolyte polymer having the formula:

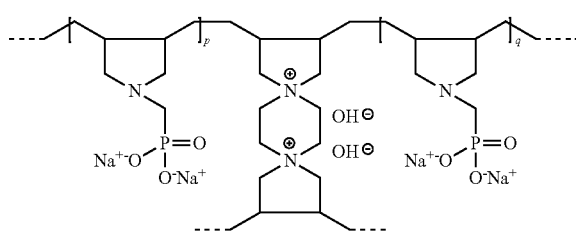

Figure 1:
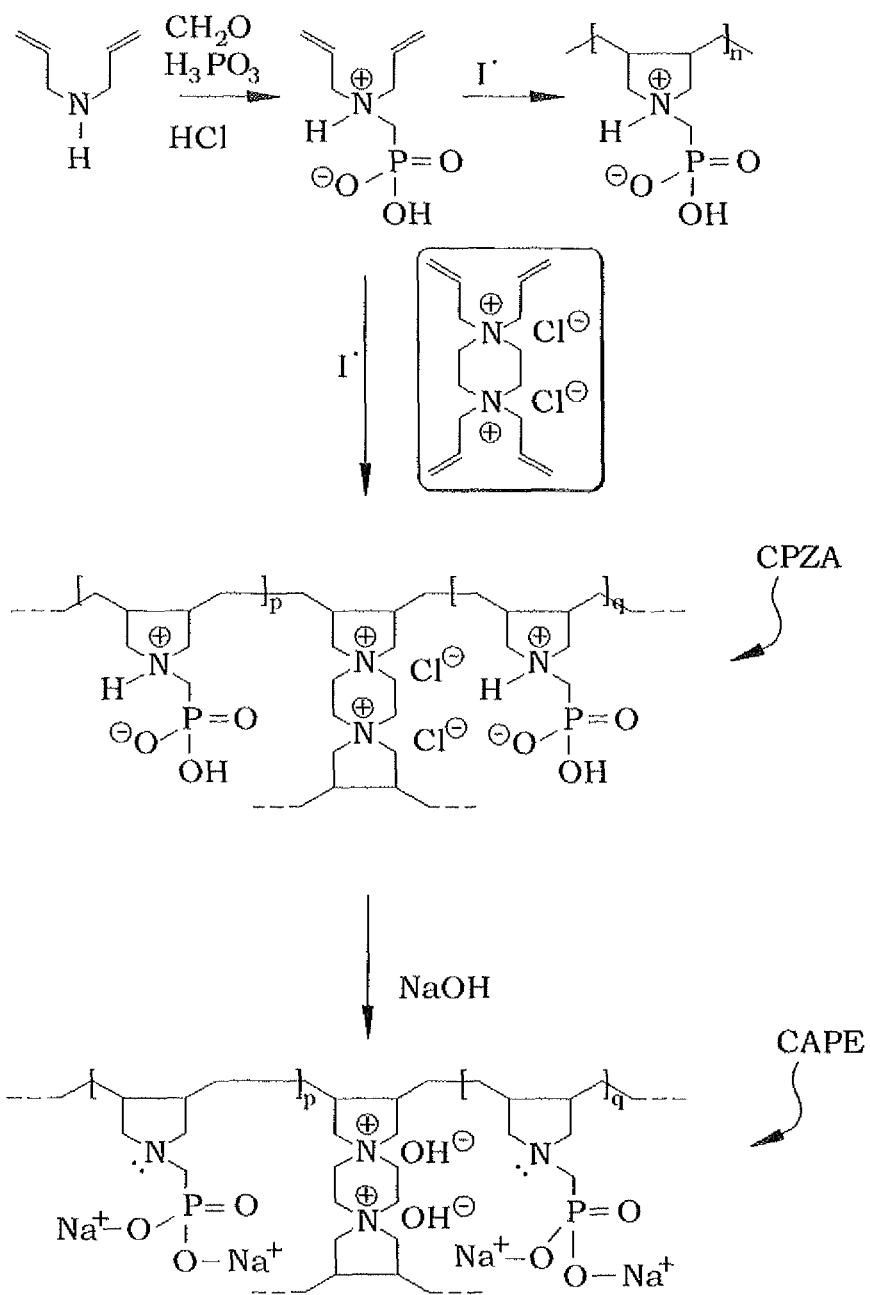
FIG. 1 is a reaction diagram showing synthesis of the cross-linked polyphosphonate composition for the removal of metal ions from wastewater according to the present invention.

As will be described in detail below, and as illustrated in FIG. 1, the cross-linked anionic polyelectrolyte (CAPE) is made by cyclocopolymerization of diallylaminomethylphosphonic acid and 1,1,4,4-tetraallylpiperazinium dichloride (a cross-linker) to form a cross-linked polyzwitterionic acid (CPZA). The CPZA is then mixed with a sodium hydroxide solution to form a cross-linked anionic polyelectrolyte polymer resin having the formula shown above.

Example 1

In order to make the diallylaminomethylphosphonic acid, the diallylaminomethylphosphonic acid is prepared conventionally, using a modified procedure. An example of such conventional preparation is shown in Kerstin Riedelsberger and Werner Jaeger, "Polymeric aminomethylphosphonic acids—1. Synthesis and properties in solution", Des. Monomers and Polym., Volume 1, Issue 4, 1998. Diallylamine (0.50 mol) was first added drop-wise to a stirred mixture of phosphorous acid (0.50 mol), 50 mL of water, and 50 mL of concentrated hydrochloric acid under ice cooling and over a period of approximately 45 minutes. The reaction mixture was then refluxed for one hour, during which paraformaldehyde (1.0 mol) was added in portions (ca. 20 minutes). The resulting solution was refluxed for an additional hour and was then evaporated to dryness to obtain 122 grams of diallylaminomethylphosphonic acid. A $^1$H nuclear magnetic resonance (NMR) spectrum of a mixture containing a known mass of the diallylaminomethylphosphonic acid product and a known mass of ethanol in $D_2O$ confirmed the purity of the product. Integration of the proton signals of the $CH_2P$— moiety of the diallylaminomethylphosphonic acid at $\delta 3.11$ vs. the $CH_2O$ moiety of ethanol at $\delta 3.40$ aided in determining the purity of the product. The resultant diallylaminomethylphosphonic acid product (122 g) contained 0.42 mol of diallylaminomethylphosphonic acid (84%). The crude sample of 0.290 g was thus found to have 1 mmol (0.191 g) of diallylaminomethylphosphonic acid (i.e., the crude product contained 66% w/w of the monomer diallylaminomethylphosphonic acid). The $^1$H NMR spectrum was very clean and free of undesired products. The monomer diallylaminomethylphosphonic acid was used in the subsequent polymerization without further purification.

The monomer 1,1,4,4-tetraallylpiperazinium dichloride, which is used as a cross-linker, was prepared conventionally. An example of such conventional preparation is shown in S. Asrof Ali, S. Zaka Ahmed, and E. Z. Hamad, "Cyclopolymerization studies of diallyl- and tetraallylpiperazinium salts", Journal of Applied Polymer Science, Vol. 61, Iss. 7, pp. 1077-1085, Aug. 15, 1996, which is hereby incorporated by reference in its entirety.

As further illustrated in FIG. 1, a solution of the monomer diallylaminomethylphosphonic acid (9 mmol; i.e., 2.61 g of 66% w/w purity) and the cross-linker 1,1,4,4-tetraallylpiperazinium dichloride (1.0 mmol, 0.319 g) were dissolved in 1.577 g of deionized water. Then, 190 mg of the initiator tert-Butyl hydroperoxide (TBHP) was added, and the reaction mixture was stirred using a magnetic stir bar in a closed flask under $N_2$ gas at a temperature of 85° C. for about 24 hours. Within 6 to 8 hours, the magnetic stir-bar used as a stirrer stopped moving and the reaction mixture became a transparent swelled gel. At the end of the elapsed time, the swelled gel of the cross-linked polyzwitterionic acid (CPZA) was soaked in water for about 1-3 hours with several replacements of the water. The swelled gel was then poured onto acetone. The resin was filtered and dried under vacuum at 70° C. to a constant weight. The resin was stable up to a temperature of 350° C., at which point its color changed to pale yellow. Analysis of the resin revealed C, 45.1; H, 7.6; N, 7.2. A copolymer from diallylaminomethylphosphonic acid ($C_7H_{13}NO_3P$) (90 mol %) and 1,1,4,4-tetraallylpiperazinium dichloride ($C_{16}H_{28}C_{12}N_2$) (10 mol %) requires C, 45.60; H, 7.53; N, 7.47; $v_{max}$ (KBr) 3500, 2876, 2817, 2779, 2700, 2626, 2375, 2279, 1657, 1464, 1086, 974, 762, 553 and 477 $cm^{-1}$.

In order to perform the basification of CPZA to the cross-linked anionic polyelectrolyte (CAPE), a mixture of the CPZA product (8.0 g, ~34 mmol) and a solution of NaOH (3.0 g, 75 mmol) in 100 mL of water was stirred at room temperature for about one hour. The resin was filtered and washed with water until a neutral filtrate was obtained. The resultant polyanion was then freeze-dried, and then further dried under vacuum at a temperature of about 70° C. to a constant weight of 6.82 g. The resin was stable up to a temperature of 350° C., at which point its color changed to pale yellow.

FT-IR spectra were recorded on a spectrometer in the region of 4000-400 $cm^{-1}$. Ion exchange capacity (IEC) was determined by the titrimetric analysis method. 100 mg of the CAPE polymer was immersed in 0.1 mol $dm^{-3}$ HCl (50 mL) for 24 hours. The decrease in acidity was determined by titration with a 0.1 mol $dm^{-3}$ NaOH solution. The IEC is calculated as $$IEC = \frac{mmol_i - mmol_f}{W},$$

where $mmol_i$ and $mmol_f$ are the respective initial and final quantities of HCl (in mmol), and W is the weight of the polymer in grams.

Example 2

The procedure for testing the adsorption of CAPE for $Pb^{2+}$ ions was as follows. A mixture of 50 mg of CAPE in 20 mL of a 0.1 mol $dm^{-3}$ aqueous $Pb(NO_3)_2$ solution was stirred using a magnetic stir-bar at different pH values for 24 hours. The resin was filtered and carefully washed with deionized water. The combined filtrate was titrated with a 0.1 mol $dm^{-3}$ aqueous ethylenediaminetetraacetic acid (EDTA) solution to determine the amount of $Pb^{2+}$ remaining. The adsorption capacity $q_{Pb^{2+}}$ was calculated as $$q_{Pb^{2+}} = \frac{(C_0 - C_f)V}{W} \text{ mmol/g},$$

where $C_0$ and $C_f$ are the respective initial and final concentrations of $Pb^{2+}$ ions, W is the weight of the polymer in grams, and V is the volume of the solution in mL. The data presented below are the average of triplicate runs, which varied by less than 4% in each case studied.

For adsorption kinetic studies, the resin sample was stirred in a 0.1 mol dm$^{-3}$ Pb(NO$_3$)$_2$ solution for different adsorption times at a preferred pH. The adsorption isotherm was constructed by changing the concentration of the Pb(NO$_3$)$_2$ solution from 0.02 to 0.1 mol dm$^{-3}$ at 25° C. for 24 hours. Based on the adsorption data from experiments carried out at different temperatures, the activation energy for the adsorption process and thermodynamic parameters $\Delta G$, $\Delta H$ and $\Delta S$ for Pb$^{2+}$ removal were calculated.

Similar experiments were conducted for the adsorption of Cu$^{+2}$ ions in a 0.1 mol dm$^{-3}$ aqueous Cu(NO$_3$)$_2$ solution. The amount of Cu$^{2+}$ ions remaining in the solution was determined by iodometric titration using excess KI and a 0.1 mol dm$^{-3}$ aqueous Na$_2$S$_2$O$_3$ solution. Finally, the desorption efficiencies of Pb$^{2+}$ and Cu$^{2+}$ ions were measured using 1.0 mol dm$^{-3}$ HNO$_3$.

Results

Figure 2:
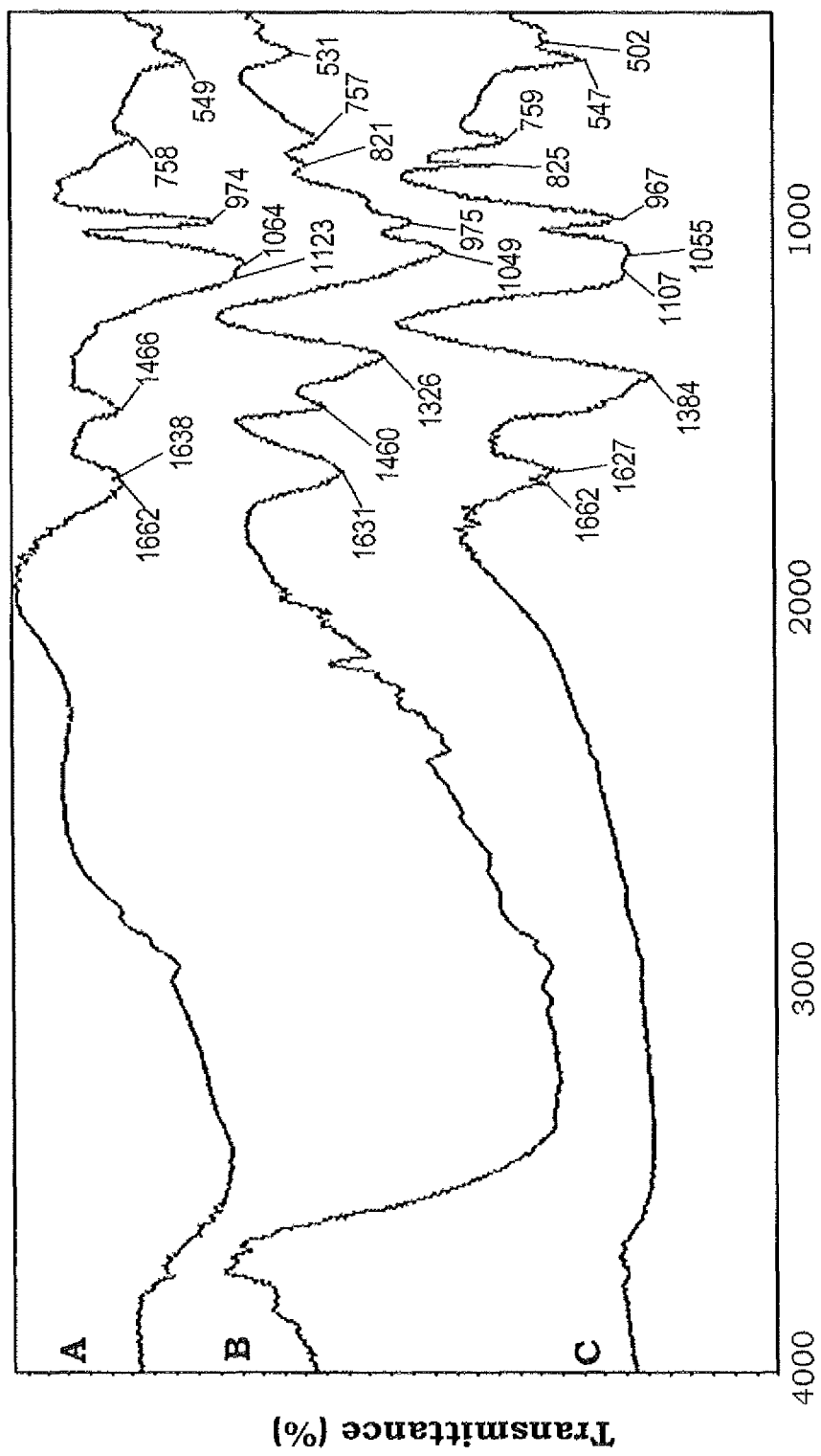
FIG. 2 illustrates the infrared (IR) spectra of the cross-linked polyphosphonate composition for the removal of metal ions from wastewater according to the present invention, with a first curve showing the composition alone, a second curve showing the composition loaded with $Cu^{2+}$, and a third curve showing the composition loaded with $Pb^{2+}$.

The ion exchange capacity (IEC) of CAPE was found to be 6.98 mmol/g, which illustrates the ability of the resin to adsorb metal ions (M$^{2+}$) as a result of the presence of chelating ligands of —N: and phosphonate motifs —P(=O)(O$^-$)$_2$. The bands in the IR spectrum of the resin in the region of 900-1150 cm$^{-1}$ are attributed to the phosphonate P—O vibrations (the A curve in FIG. 2). The IR spectra of CAPE loaded with Cu$^{2+}$ and Pb$^{2+}$ (the B and C curves in FIG. 2, respectively) revealed the increase in the intensity and broadness of the phosphonate P—O vibrations as a result of the adsorption of the metal ions. The C—N absorption was found near ~1460 cm$^{-1}$. The peaks around 1650 cm$^{-1}$ were attributed to the H—O—H bending vibration. The appearances of new strong bands 1326 cm$^{-1}$ (in the B curve) and 1384 cm$^{-1}$ (in the C curve) were attributed to the presence of an ionic nitrate group, since the adsorption process was carried out in the presence of lead and copper nitrates. The presence of these strong bands implies the ability of the resin to also act as an anion exchanger. It should be noted that the absorption band attributed to the nitrate ion is absent in the IR spectrum of the unloaded resin (shown in the A curve).

Figure 3A:
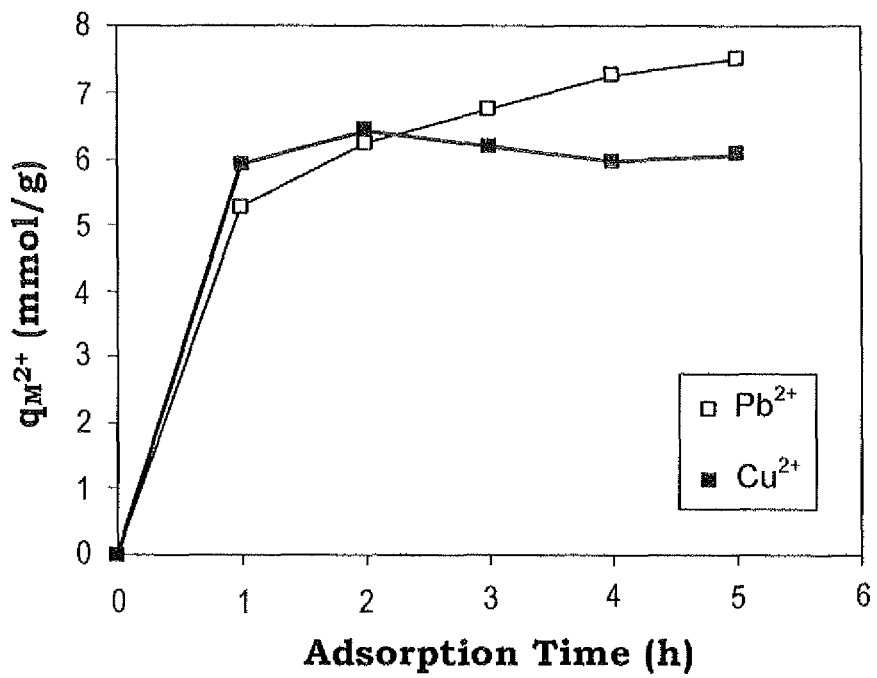
FIG. 3A is a graph showing absorption kinetic curves of the cross-linked polyphosphonate composition for the removal of metal ions from wastewater according to the present invention for $Cu^{2+}$ and $Pb^{2+}$ in 0.1 M solution at a pH of 4 at 25° C.

The adsorption kinetics, as described by the relationship between adsorption capacity and adsorption time, are shown in FIG. 3A. It was found that the adsorption of Cu$^{2+}$ by CAPE reached equilibrium in about one hour, and the adsorption of Pb$^{2+}$ ions by CAPE reached equilibrium in more than five hours.

The Lagergren adsorption kinetic model is a suitable tool to investigate the adsorption properties of a polymer. The following equations express the linearly first-order and second-order kinetic equations for the Lagergren model, respectively:

$$\log(q_e - q_t)\log q_e - \frac{k_1 t}{2.303}; \text{ and } \frac{t}{q_t} = \frac{1}{k_2 q_e^2} + \frac{t}{q_e},$$

where k$_1$ and k$_2$ are the first-order and second-order rate constants, respectively, and q$_t$ and q$_e$ are the adsorption capacity of the metal ions at a time t and at equilibrium, respectively.

Figure 3B:
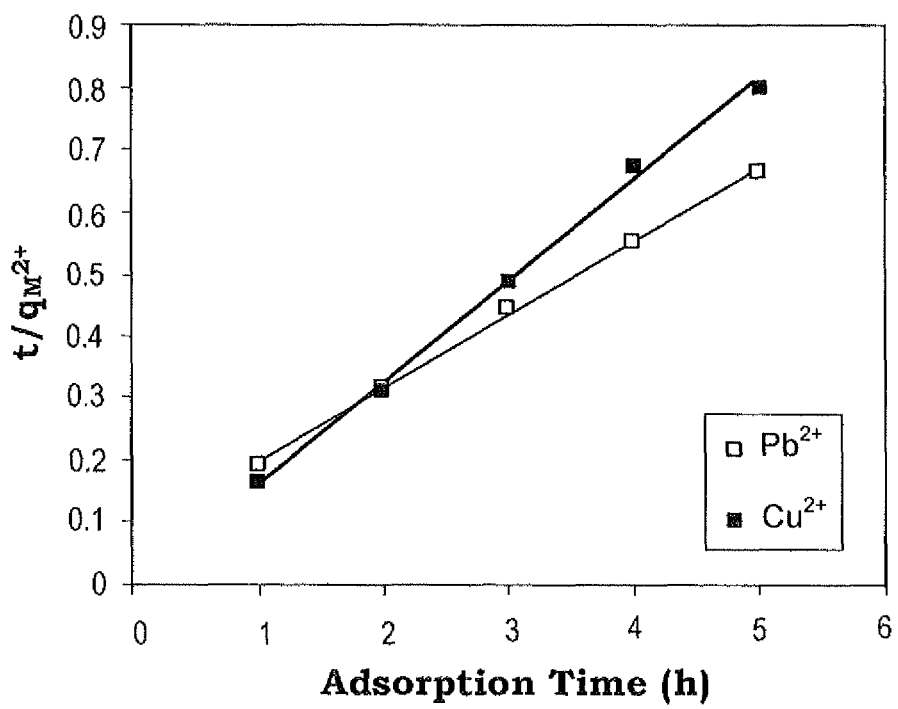
FIG. 3B is a graph showing a Lagergren second-order kinetic model of the cross-linked polyphosphonate composition for the removal of metal ions from wastewater according to the present invention for adsorption of $Cu^{2+}$ and $Pb^{2+}$.

Neither Pb$^{2+}$ nor Cu$^{2+}$ fit the first-order Lagergren kinetic model. The second-order Lagergren kinetic model (shown in FIG. 3B), however, fit well for the adsorption of both Cu$^{2+}$ and Pb$^{2+}$ ions on CAPE, which suggests that the adsorption process might be chemical adsorption. The values shown below in Table 1 show that the rate constant k$_2$ for the removal of Cu$^{2+}$ is much higher than that for Pb$^{2+}$. However, CAPE adsorbs a larger amount of Pb$^{2+}$ at the longer periods of time (as shown in both Table 1 and FIG. 3A). The absorption capacity of Pb$^{2+}$ is, thus, found to be larger than that of Cu$^{2+}$. The rationale for such a difference could be attributed to the lower effective ionic radii of Pb$^{2+}$ (4.5 Å) as compared to that of Cu$^{2+}$ (6 Å) and the differences in affinity of the phosphonate motifs in the resin for the metal ions. The experimental data revealed that the resin is an efficient adsorbent for the removal of both lead and copper ions from aqueous solutions.

TABLE 1

Lagergren second-order kinetic model parameters for Cu$^{2+}$ and Pb$^{2+}$ adsorption

| Entry No. | Metal ion | $k_2$ (h g mmol$^{-1}$) | $h^a$ (h g mmol$^{-1}$) | $q_e$ (mmol g$^{-1}$) | $q_{e,exp}$ (mmol g$^{-1}$) | $R^2$ |
|---|---|---|---|---|---|---|
| 1 | Cu$^{2+}$ | 88.13 | 3333.3 | 6.150 | 6.05 | 0.9963 |
| 2 | Pb$^{2+}$ | 0.177 | 12,822 | 8.446 | 7.50 | 0.9987 |

$^a$Initial adsorption rate h = $k_2 q_e^2$

Figure 4A:
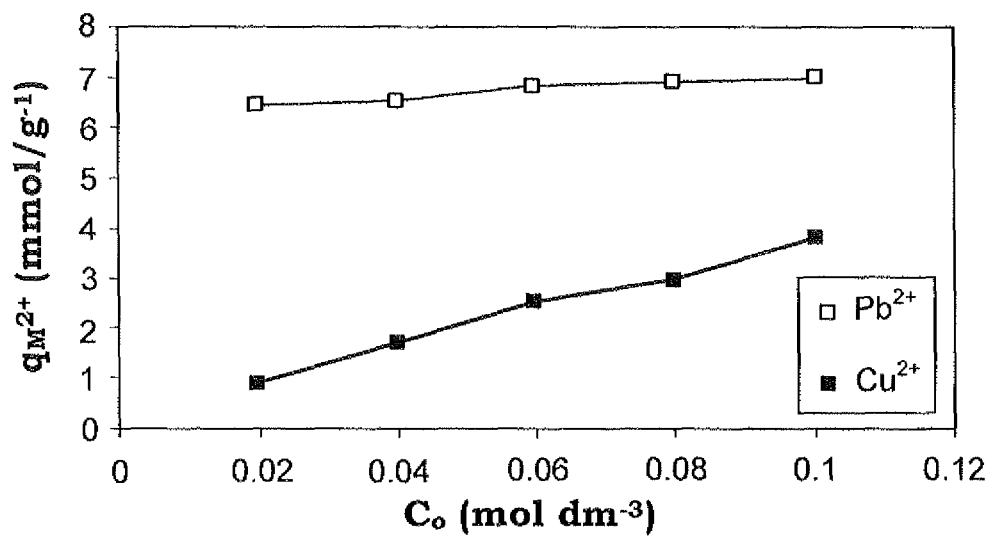
FIG. 4A is a graph illustrating the effect of initial concentration on the adsorption capacity of the cross-linked polyphosphonate composition for the removal of metal ions from wastewater according to the present invention at a pH of 4 for 24 hours and a temperature of 25° C.
Figure 4B:
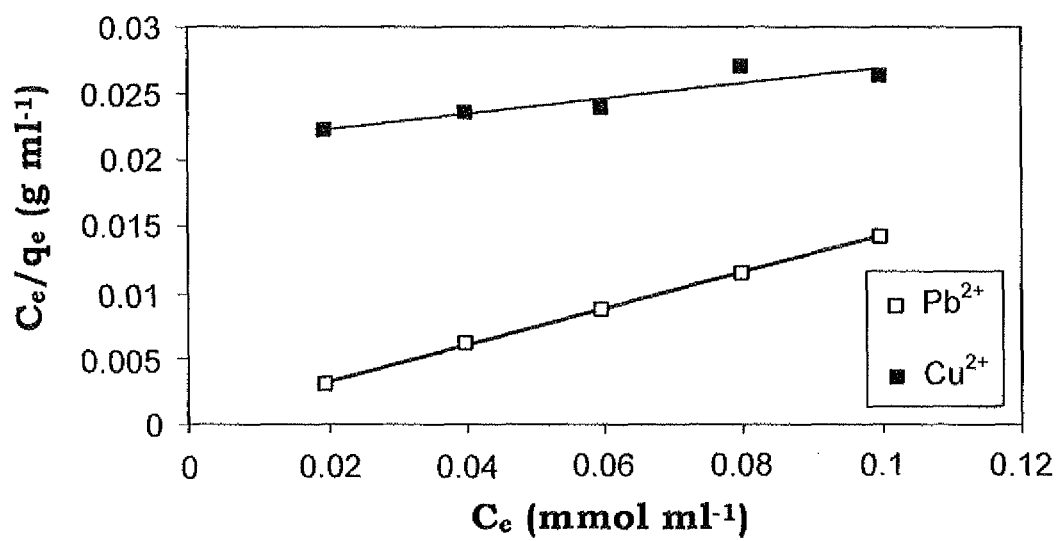
FIG. 4B is a Langmuir isotherm curve of the adsorption of $Cu^{2+}$ and $Pb^{2+}$ ions by the cross-linked polyphosphonate composition for the removal of metal ions from wastewater according to the present invention.
Figure 4C:
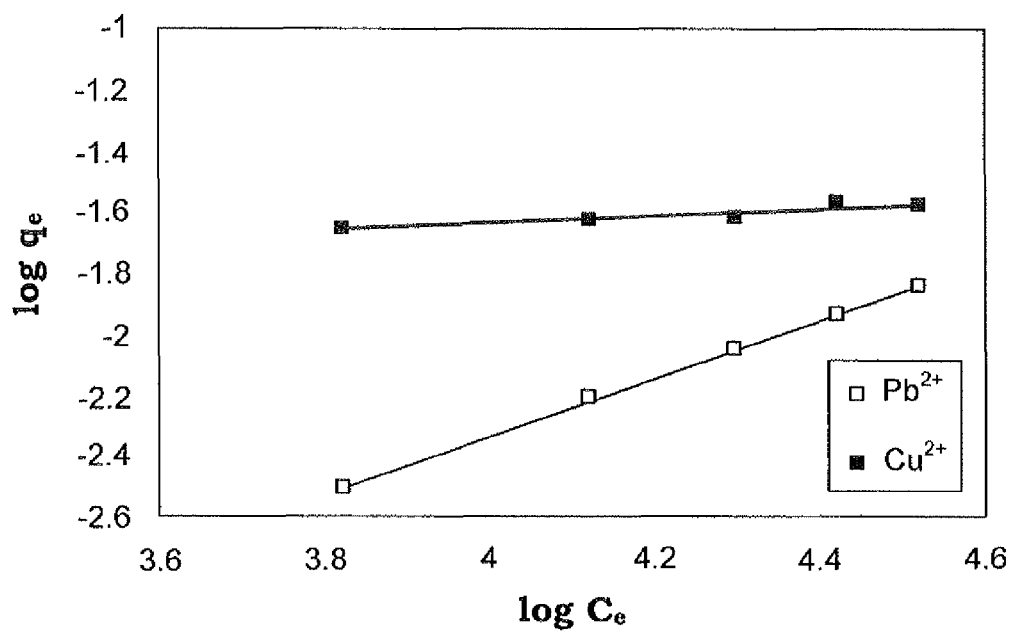
FIG. 4C is a Freundlich isotherm curve of the adsorption of $Cu^{2+}$ and $Pb^{2+}$ ions by the cross-linked polyphosphonate composition for the removal of metal ions from wastewater according to the present invention.

As shown in FIG. 4A, the adsorption capacity of CAPE increases with the increase in initial concentration of Cu$^{2+}$ and Pb$^{2+}$ ions. To further explore the adsorption mechanism, Langmuir and Freundlich isotherm models were used to analyze the adsorption data. The Langmuir isotherm equation can be expressed as $$\frac{C_e}{q_e} = \frac{C_e}{Q_m} + \frac{1}{Q_m b},$$

where it is assumed that the mechanism of the adsorption process is a monolayer adsorption on the surface of the polymer. In this equation, C$_e$ and q$_e$ are the concentrations of metal ion in the solution and resin, respectively, and Q$_m$ and b are the Langmuir constants. FIG. 4B illustrates the Langmuir plot of C$_e$/q$_e$ vs. C$_e$, enabling the calculation of Langmuir constants from the intercept and slope of the linear plot. The Freundlich isotherm model, on the other hand, describes the adsorption occurring on a heterogeneous surface with uniform energy, and is given by the following two equations:

$$q_e = k_f C_e^{1/n} \text{ and } \log q_e = \log k_f + \frac{1}{n}\log C_e,$$

where q$_e$ and C$_e$ are the equilibrium concentrations of metal ion in the adsorbed and liquid phase, respectively, and k$_f$ and n represent the Freundlich constants, which can be calculated from the slope and intercept of the linear plot of log q$_e$ vs. log C$_e$ as shown in FIG. 4C.

FIGS. 4B and 4C illustrate that the adsorption of Pb$^{2+}$ ions fit well with both the Langmuir and the Freundlich isotherm models, thus implying that the adsorption may occur as a monolayer, as well as a heterogeneous surface adsorption. For the adsorption of Cu$^{2+}$ ions, the experimental data gave a similar fit with both models, although with poor regression coefficients (R$^2$). The Langmuir and Freundlich isotherm model constants are given in Table 2 below. At a pH of 4, the zwitterionic phosphonate motifs [i.e., NH$^+$ . . . P(=O)(OH) O$^-$] in CPZA may partially change to zwitterionic/anionic motifs [i.e., NH$^+$ . . . P(=O)(O$^-$)$_2$], which can influence the adsorption of metal ions on the resin surface by electrostatic adsorption that follows the Langmuir adsorption model.

TABLE 2

Langmuir and Freundlich isotherm model constants for $Cu^{2+}$ and $Pb^{2+}$ adsorption

Langmuir isotherm model

| Entry No. | Metal ion | $Q_m$ (mmol g$^{-1}$) | b (dm$^3$ mmol$^{-1}$) | $R^2$ |
|---|---|---|---|---|
| 1 | $Cu^{2+}$ | 17.0 | 2.792 | 0.8610 |
| 2 | $Pb^{2+}$ | 7.19 | 347.8 | 0.994 |

Freundlich isotherm model

| Entry No. | Metal ion | $k_f$ | n | $R^2$ |
|---|---|---|---|---|
| 1 | $Cu^{2+}$ | 0.00235 | 4.577 | 0.8483 |
| 2 | $Pb^{2+}$ | 7.62 × 10$^{-7}$ | 1.047 | 0.9996 |

For the Langmuir isotherm model, a separation factor or equilibrium parameter $R_L$ can be used to describe the favorability of adsorption on the polymer surface as $$R_L = \frac{1}{(1+bC_0)},$$

where $C_0$ is the initial $M^{2+}$ concentration and b is the Langmuir equilibrium constant. A favorable adsorption is indicated when the $R_L$ value is between 0 and 1, whereas the value outside this range describes an unfavorable adsorption. The $R_L$ values for the adsorption of both metal ions are given in Table 3 below, which reveals that the values fall in the preferred region (i.e., 0<$R_L$<1). The results confirm that CAPE is an effective adsorbent for the removal of heavy metal ions in aqueous solutions.

TABLE 3

The $R_L$ values based on the Langmuir isotherm model

| $C_O$ (mol dm$^{-3}$) | $R_L$ value $Cu^{2+}$ | $R_L$ value $Pb^{2+}$ |
|---|---|---|
| 0.02 | 0.9471 | 0.1257 |
| 0.04 | 0.8995 | 0.06706 |
| 0.06 | 0.8565 | 0.04573 |
| 0.08 | 0.8174 | 0.03469 |
| 0.10 | 0.7817 | 0.02795 |

Figure 5:
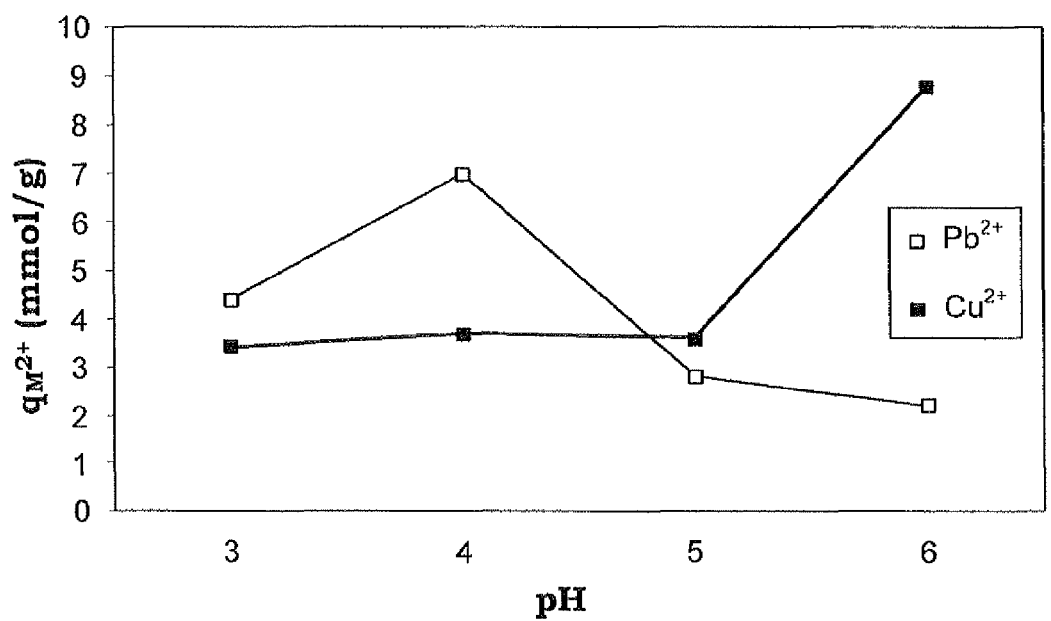
FIG. 5 illustrates the pH dependence of metal uptake by the cross-linked polyphosphonate composition for the removal of metal ions from wastewater according to the present invention.

The effect of pH (in the range of 3 to 6) on the uptake of $Pb^{2+}$ and $Cu^{2+}$ was investigated at a fixed concentration (0.1 M) and time of 24 hours. The pH of the solution was controlled by using an acetate buffer ($CH_3COONa/CH_3COOH$). The results of metal uptake at different pH values are shown in FIG. 5. The optimal pH was found to be 4. At higher pH values, the hydrolysis of the metal ions occurs by the formation of metal hydroxides, which compete with the metal ion uptake by the resin.

Figure 6A:
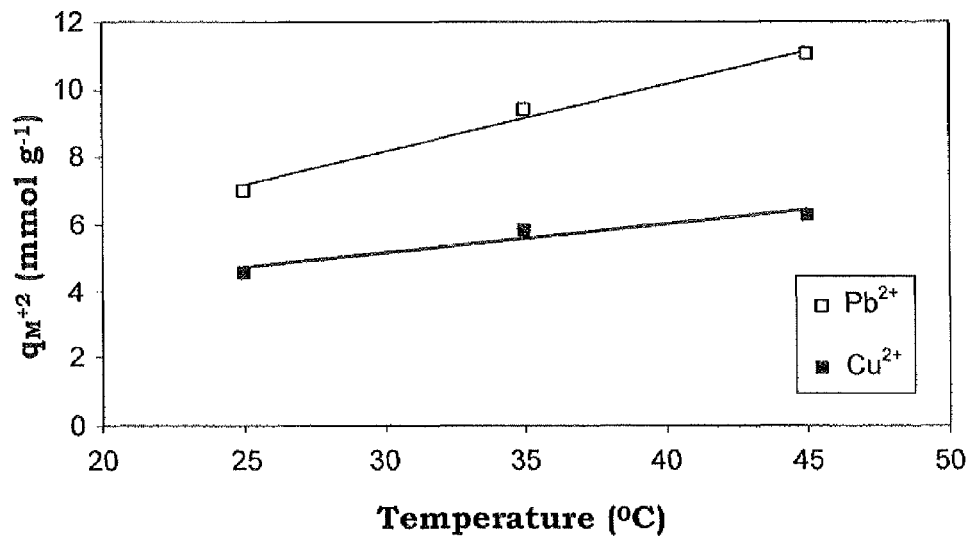
FIG. 6A is a graph illustrating the effect of temperature on the adsorption capacity of the cross-linked polyphosphonate composition for the removal of metal ions from wastewater according to the present invention.
Figure 6B:
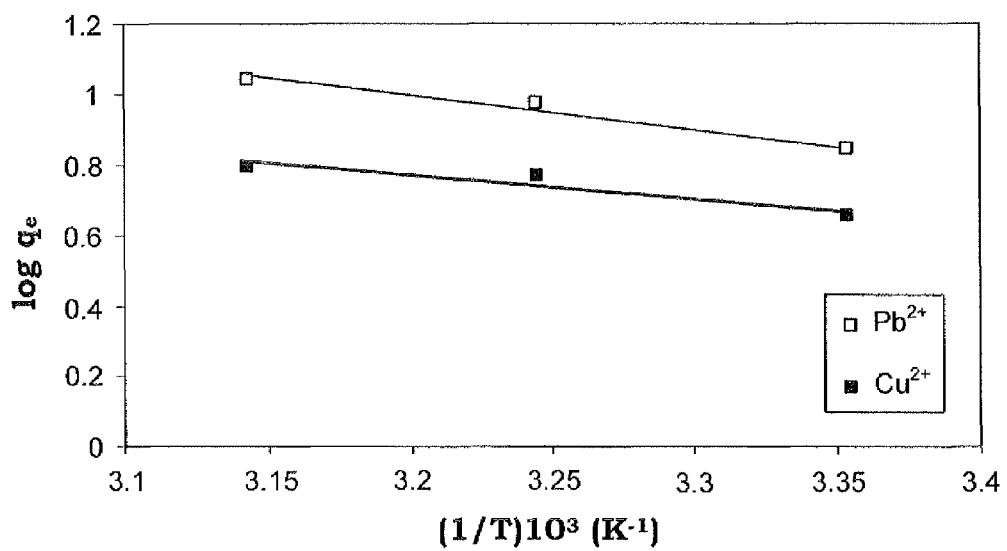
FIG. 6B is a graph illustrating the Arrhenius plot for the adsorption process for the cross-linked polyphosphonate composition for the removal of metal ions from wastewater according to the present invention.

Adsorption experiments were also performed to obtain the thermodynamic parameters, and these results are shown in FIG. 6A. As can be seen, the adsorption capacity increases with the increase in temperature, suggesting that the adsorption process is endothermic, and this is due to the fact that at higher temperature, swelling of the resin increases which permits greater diffusion of the metal ions. The activation energy of the adsorption process can be calculated by plotting log $q_e$ vs. 1/T, as shown in FIG. 6B. Using the Arrhenius equation $$\log q_e = -\frac{E_a}{2.303RT} + \text{constant},$$

the activation energies were found to be 12.8 and 17.9 kJ/mol for the adsorption of $Cu^{2+}$ and $Pb^{2+}$, respectively. These $E_a$ values are relatively low in comparison to typical chemical reactions with activation energies of 65-250 kJ/mol, thus indicating that the adsorption of the metal ions is relatively easy and a favored process.

Figure 6C:
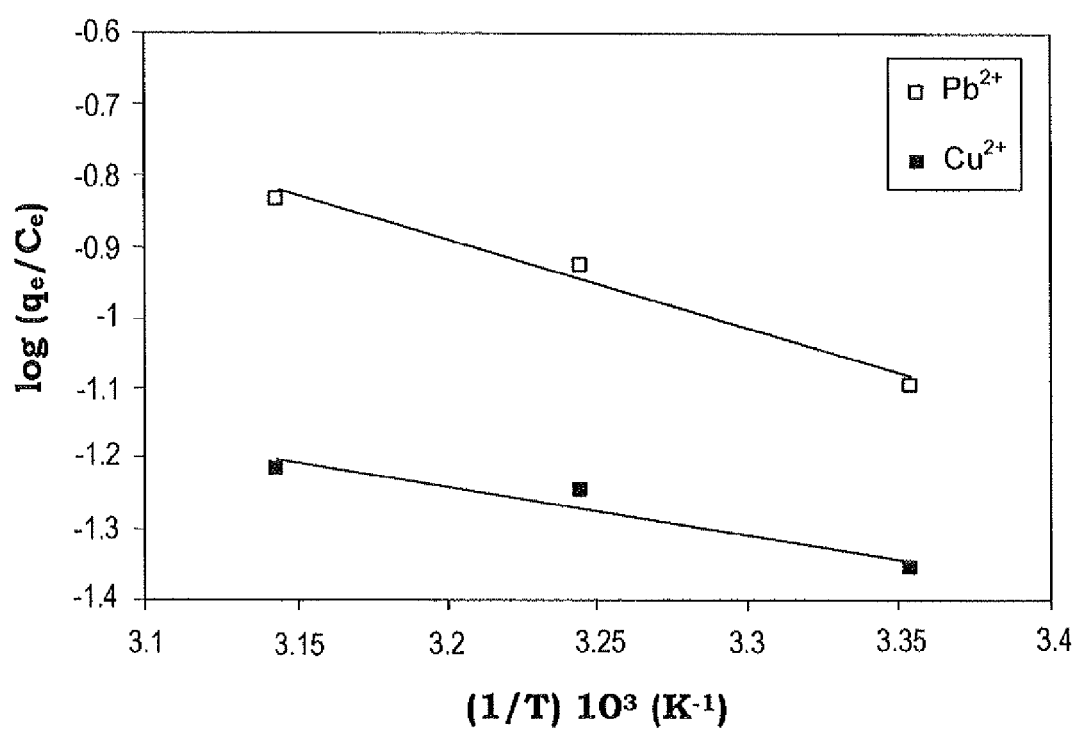
FIG. 6C is a graph illustrating the Vant-Hoff plot for the adsorption process for the cross-linked polyphosphonate composition for the removal of metal ions from wastewater according to the present invention.

A plot of log($q_e/C_e$) vs. 1/T is shown in FIG. 6C. The thermodynamic parameters ΔG, ΔH and ΔS were calculated using the Vant-Hoff equation $$\log\left(\frac{q_e}{C_e}\right) = -\frac{\Delta H}{2.303RT} + \frac{\Delta S}{2.303R},$$

and are tabulated in Table 4 below. The negative ΔG values illustrate the spontaneity of the adsorption process.

TABLE 4

Thermodynamic Data for $Pb^{2+}$ and $Cu^{2+}$ adsorption

| Metal ion | Temperature (K) | ΔG (kJ/mol) | ΔH (kJ/mol) | ΔS (J/mol K) | $R^2$ |
|---|---|---|---|---|---|
| $Pb^{2+}$ | 298 | −17.4 | | | |
| | 308 | −17.8 | 23.5 | 58.0 | 0.9774 |
| | 318 | −18.4 | | | |
| $Cu^{2+}$ | 298 | −5.09 | | | |
| | 308 | −5.26 | 12.8 | 57.1 | 0.9103 |
| | 318 | −5.44 | | | |

As the temperature increases, the ΔG values become more negative, indicating that the adsorption is more favorable at the higher temperatures. Favorable adsorption at higher temperatures is attributed to the greater swelling of the resin and increased diffusion of metal ions into the resin. Greater dissociation of zwitterionic phosphonate motifs, $NH^+ \ldots P(=O)(OH)O^-$ to zwitterionic/anionic motifs, $NH^+ \ldots P(=O)(O^-)_2$, at elevated temperatures is also expected to increase the electrostatic attractions between the metal ions and ion exchange groups. The positive values of ΔH show that the adsorption is an endothermic process. In addition, it can be seen in Table 4 that the ΔS values are positive, suggesting that the randomness increased during the adsorption of metal ions as a result of the release of water molecules from their large hydration shells.

Unloaded and loaded CAPE were further investigated by scanning electron microscopy. Unloaded CAPE was immersed in 0.1 M $Pb(NO_3)_2$ and 0.1 M $Cu(NO_3)_2$ for 24 hours at a pH of 4, filtered and dried under vacuum until a constant weight was achieved. Loaded and unloaded polymers were then sputter-coated for 6 minutes with a thin film of gold. Resultant CAPE SEM images showed that the CAPE adsorbed both metals, and the adsorption process occurred on the surface and throughout the polymer, which was further confirmed by energy-dispersive X-ray spectroscopy (EDX analysis).

One of the important criteria for the effective usage of adsorbents is the recycling and reuse of the adsorbent. For this purpose, a further experiment was conducted by immersing 100 mg of CAPE resin in 20 mL of 0.1 mol dm$^{-3}$ $Cu(NO_3)_2$ (or $Pb(NO_3)_2$) for 24 hours. The loaded resin was then filtered and immersed in 1.0 mol dm$^{-3}$ $HNO_3$ for 30 minutes. After filtration, the amount of metal ions desorbed in the filtrate was determined. The efficiency of the desorption process was calculated by the ratio of desorbed $M^{2+}$ ions to the amount of adsorbed $M^{2+}$ ions in the resin. The results indicated that the percentage efficiency of the desorption process are 77.8% and 63.3% for $Cu^{2+}$ and $Pb^{2+}$ ions, respectively. These results indicate an effective regeneration cycle, thus the present cross-linked anionic polyelectrolyte polymer may be used as an effective adsorbent for the removal of $Cu^{2+}$ and $Pb^{2+}$ ions from aqueous solutions.

It is to be understood that the present invention is not limited to the embodiments described above, but encompasses any and all embodiments within the scope of the following claims.

We claim:

1. A cross-linked polyphosphonate composition for the removal of metal ions from wastewater, comprising a cross-linked anionic polyelectrolyte polymer having the formula:

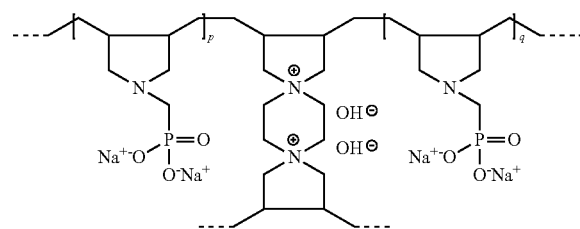

2. A method of making the cross-linked polyphosphonate composition for the removal of metal ions from wastewater according to claim 1, comprising the steps of:
   cyclocopolymerizing diallylaminomethylphosphonic acid and 1,1,4,4-tetraallylpiperazinium dichloride to form a cross-linked polyzwitterionic acid;
   treating the cross-linked polyzwitterionic acid with base to form a cross-linked anionic polyelectrolyte polymer.

3. The method of making the cross-linked polyphosphonate composition for the removal of metal ions from wastewater according to claim 2, wherein the base is sodium hydroxide, whereby the cross-linked anionic polyelectrolyte polymer has the formula:

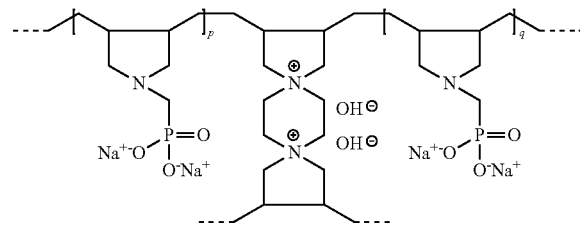

4. The method of making the cross-linked polyphosphonate composition for the removal of metal ions from wastewater according to claim 2, further comprising the step of initiating the cyclopolymerization with tert-Butyl hydroperoxide (TBHP).

5. The method of making the cross-linked polyphosphonate composition for the removal of metal ions from wastewater according to claim 4, wherein said cyclopolymerizing step is maintained for about 24 hours.

6. The method of making the cross-linked polyphosphonate composition for the removal of metal ions from wastewater according to claim 5, wherein the cyclopolymerizing step further comprises maintaining the reaction temperature at about 85° C. during polymerization.

7. The method of making the cross-linked polyphosphonate composition for the removal of metal ions from wastewater according to claim 2, wherein the cross-linked polyzwitterionic acid polymer comprises a gel, the method further comprising the step of soaking the gel in water for about 1-3 hours.

8. The method of making the cross-linked polyphosphonate composition for the removal of metal ions from wastewater according to claim 7, further comprising the steps of:
   pouring the gel into acetone;
   filtering the gel from the acetone; and
   drying the filtrate under vacuum at 70° C. to obtain the cross-linked polyzwitterionic acid polymer as a solid resin.

9. The method of making the cross-linked polyphosphonate composition for the removal of metal ions from wastewater according to claim 8, wherein said step of treating the cross-linked polyzwitterionic acid with base further comprises mixing the solid resin with an aqueous solution of sodium hydroxide, the cross-linked polyzwitterionic acid polymer being in a molar ratio of about 1:2 with the sodium hydroxide.

10. The method of making the cross-linked polyphosphonate composition for the removal of metal ions from wastewater according to claim 9, further comprising the steps of filtering the cross-linked anionic polyelectrolyte polymer product from the mixture of resin and aqueous sodium hydroxide, freeze-drying the product, and then further drying the product under vacuum at a temperature of about 70° C.

\* \* \* \* \*